April 4, 1967 H. SIEBERT 3,312,079
INDICATOR DEVICE FOR DEEP-FREEZE PRODUCTS
Filed Aug. 27, 1965 3 Sheets-Sheet 1
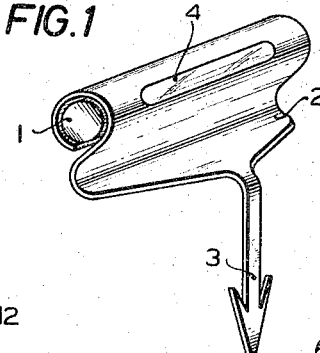
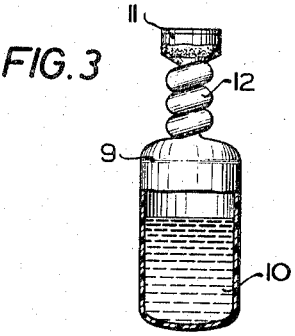
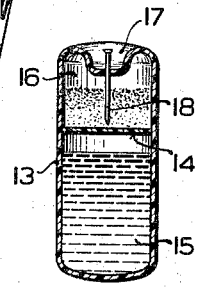
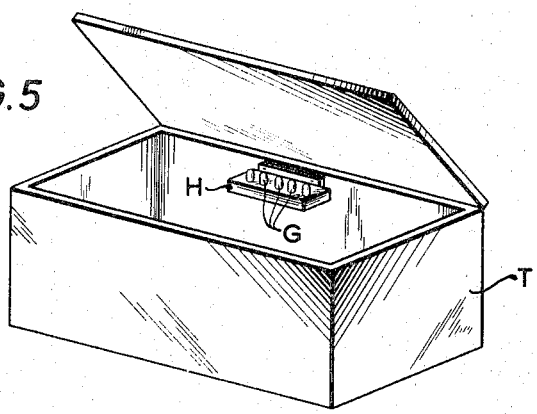
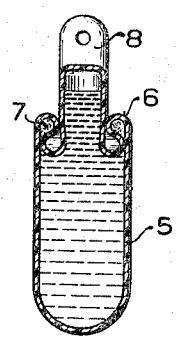
INVENTOR
Hans Siebert
by Michael S. Striker
ATTY FIG.6
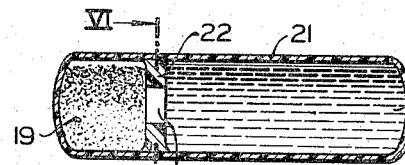
FIG.6a
FIG.7
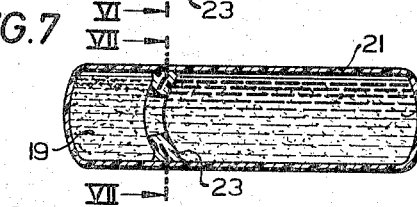
FIG.7a
FIG.8
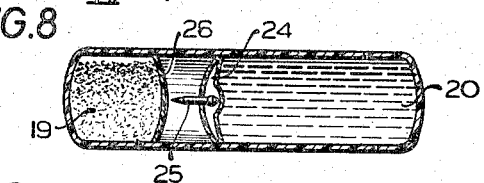
FIG.9
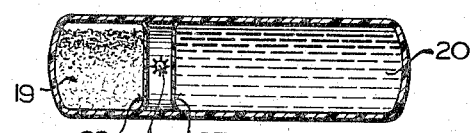
FIG.10   FIG.11
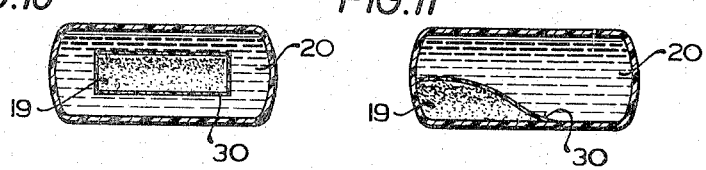
FIG.12
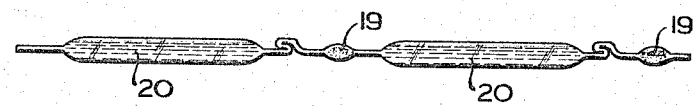
FIG.13
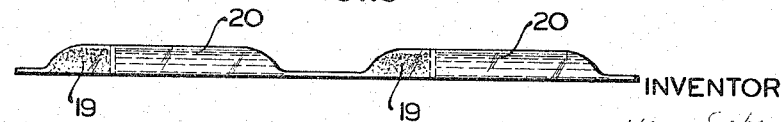
INVENTOR
Hans Siebert
by
Michael S. Striker

United States Patent Office 3,312,079
Patented Apr. 4, 1967

3,312,079
INDICATOR DEVICE FOR DEEP-FREEZE PRODUCTS
Hans Siebert, 1 Seibertweg, Kassel-Wilhelmshohe, Germany
Filed Aug. 27, 1965, Ser. No. 483,094
Claims priority, application Germany, Mar. 23, 1965, S 96,134
2 Claims. (Cl. 62—130)

The present invention concerns an indicator device for deep-frozen products and is more particularly concerned with a member for indicating when a predetermined limit temperature has been exceeded, adapted to be connected to the deep-frozen product.

Such a device has as object to permit the user to check a deep freezing action, and see whether the deep-frozen article has been subjected since the commencement of the deep-freezing action to any inadmissibly high temperature which would change the nature of the deep-frozen article and possibly render it useless.

Conventional temperature indicators, such as e.g. mechanical maximum or maximum-and-minimum thermometers made of glass are not suitable for such purposes owing to their sensitivity to mechanical stresses and owing to their relatively high price. Dyes are known which, when subjected to temperature changes, suffer a colour change; such dyes are not however usable for the purpose described, since every individual temperature corresponds to a colour shade and therefore if a change of colour occurs due to a rise in temperature, when renewed cooling sets in to the original low temperature, it disappears again, so that the colouration at the end of the deep-freezing process gives no indication regarding possible previous inadmissible temperature increases.

The object of the invention is to provide an indicating device which is simple, rugged and inexpensive, that may be applied to any deep-frozen article during transit and storage, and which at the end of the deep freezing operation reliably indicates if an inadmissible temperature increase has occurred.

According to the present invention the indicating member comprises a vessel containing a filler compound and the latter on reaching a limit temperature causes a visible change of state of the vessel and/or its contents. Such a vessel may be very simple and mechanically robust and therefore adapted to be applied to any deep-frozen article, even to every individual package. The permanent visible change of state of the vessel, which may be a change of colour of the contents of the vessel or a change of shape of the vessel itself, ensures a reliable indication of a prior inadmissible temperature increase.

The invention has two different embodiments; on the one hand an irreversible colour or state change of the filling compound on reaching or exceeding the limit temperature owing to the change of its aggregate state in a transparent vessel is used for indication, and on the other hand the change of volume of the filling compound is converted into a visible permanent colour change of the control member or vessel. In the case of a visible colour change in accordance with the invention, either a filling composition having several components is used, which sets on cooling and, when reheated melts to produce an irreversible change of colour (so-called ice-region melting), or a dye and reagent are kept separated until a predetermined low temperature is reached and then the separation is cancelled, so that when the limit temperature is reached or exceeded, one or both components melt and react together to change the colouring.

The invention will be described further, by way of example, with reference to the accompanying drawings, in which:

FIG. 1 is a diagrammatic view of an indicating device having a transparent vessel for the multi-component filler compound during the ice-region melting;

FIGS. 2 to 4 are longitudinal sections of three different embodiments of the device for the separate accommodation of dye and reagent and manual cancellation of the separation after freezing;

FIG. 5 is a schematic view of a plurality of devices arranged in a deep-freeze container;

FIGS. 6 to 11 are longitudinal sections showing five different embodiments of devices having separate accommodation of dye and reagent and automatic cancellation of the separation after freezing;

FIGS. 12 and 13 show schematically two embodiments of the strip-like adaptation of the devices.

Figure 14:
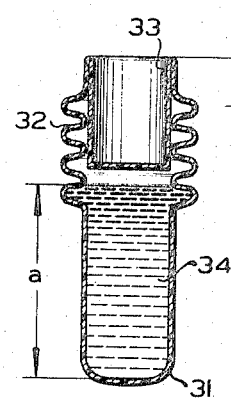
FIGS. 14 to 19 are longitudinal sections showing four different embodiments of devices having visible change of shape of the indicating member in dependence upon the temperature.

Two methods of operation are considered for indication by means of a colour change of the filling compound in a transparent vessel.

First, if the vessel is filled with a chemical solution which e.g. at −15° C. changes from liquid to solid such as a crystalline state, the solution comprising two or more components, and is heated again after cooling, then only those components are melted out of the solid substance the melting points of which are higher than the initial temperature, e.g. −12° C., −10° C., −5° C., whilst components having a still higher melting point, remain crystalline.

The choice of components decides at what temperature one or more of the components change from solid to liquid state. The components are so chosen that renewed freezing to −15° C. or lower cannot reconvert all of them into the original state of a homogeneously-appearing solid.

Second, the vessel is filled with a chemical solution which sets at −15° C.; the components are immaterial if it has a melting point only a few degrees higher than −15° C. After freezing the vessel has a dye added thereto, preferably in solid or crystalline form. Then, if in course of the freezing period the vessel is subjected to a temperature at which the chemical solution melts, the dye is dissolved and due to the spread of colouration indicates that the required freezing temperature has been exceeded.

The embodiment in accordance with FIG. 1 is suitable for the first method of operation. The vessel 1 provided with a multi-component filling compound is made of transparent material, preferably plastics material. For protection against damage the vessel 1 is enclosed in a protective jacket 2 which is continued in a tapered end 3, this barb serving for attachment to the deep-frozen article. The viewing window 4 permits the state of the filling compound to be observed. It is possible to provide several windows, or the protective jacket may be lattice-like.

The embodiments illustrated in FIGS. 2 to 4 and 6 to 11 serve to carry out the second method of operation. This method of operation depends upon the dye being brought into contact with the reagent only after the latter has frozen.

The embodiment in accordance with FIG. 2 is constructed in the following manner. The wall 5 of the vessel of transparent plastics material is turned in or out in such a manner at any point that a pocket 6 is formed in which the dye 7 is disposed; the latter may be powdery or crystalline or in the form of a paste applied to the inside wall surface of the vessel, e.g. by means of a pressing method. The pocket is hermetically sealed against the subsequently inserted solution. As soon as this control device secured to its article has been brought to the deep-freezing temperature and the solution has frozen, a pull on the grip 8 causes the vessel to be stretched, whereby dye and crystal are located in a single space. As soon as the reagent, by reaching a predetermined higher limit temperature, becomes liquid, the dye is dissolved and changes colour, and does not revert even if the solution freezes again.

In the embodiment in accordance with FIG. 3 the vessel comprises a plastically deformable transparent ampoule 9. Within this ampoule 9 a chamber 10 is provided for the reagent liquid which solidifies at the deep-freezing temperature, and a chamber 11 with the crystalline dye for the colour reaction. These chambers are separated from one another by the fact that the ampoule 9 is twisted over a section 12 between the chambers 10 and 11. On reaching the deep-freezing temperature, i.e. when the reagent liquid in chamber 10 solidifies, the twisted section is untwisted whereby the dye can contact the material 10.

In the embodiment in accordance with FIG. 4, the vessel consists of a deformable ampoule 13. In this ampoule two chambers 15 and 16 are formed for the reagent liquid or the crystalline dye by means of a separtaing wall 14. In the ampoule 13, a needle 18 is retained in its depressed head 17. On reaching the deep freezing temperature and freezing of the reagent liquid the separating wall 14 is punctured by means of the needle 18, by applying pressure against the ampoule at 17 so that when the reagent liquid melts owing to a temperature increase, the dye reacts with it and changes colour irreversibly.

FIG. 5 shows an example of an indicating device, wherein several vessels G are retained in a holder H in the deep-freezing container T at deep-freezing temperature so as to be individually removable. In this way vessels G are constantly in a state of readiness for use, i.e. the controlling fluid has solidified. When filling the deep-freezing container T, a test vessel is located on each article being cooled after the twisting section 4 has been released or the separating wall 6 has been punctured or the straightening of the member in accordance with FIG. 2 has been effected. If the reagent liquid melts on reaching the predetermined maximum temperature, the required dye reaction occurs.

In the example in accordance with FIGS. 6 and 7 the dye 19 and the reagent 20 are accommodated in a transparent ampoule-like housing 21 made of plastics material, in separate chambers and separated from one another by a deformable separating wall 22. The separating wall 22 has a valve in the form of a slot 23. As shown in FIG. 6 the slot 23 is closed before reaching a certain solidifying temperature. If this device is introduced together with the article to be deep-frozen, into the deep-freezing compartment, then the device cools. Due to expansion of the liquid 20 the separating wall 22 is so bulged out as shown in FIG. 7 that the slot 23 opens thereby cancelling the separation between dye 19 and reagent 20. If an inadmissible subsequent temperature rise of the deep-freeze product occurs, an irreversible colouring of the contents of the control device follows. Instead of the slit valve described it is also possible to use a ball valve or any other suitable form.

In the example according to FIG. 8 a needle 25 is retained in a separating wall 4 between dye and reagent. In freezing and expansion of the reagent 20 as described above, the separating wall 24 bulges out and the needle 25 punctures the separating walls 24 and 26 between dye and reagent, so that the separation between dye and reagent is cancelled.

In the embodiment in accordance with FIG. 9 a spiked member 29 is arranged between the separating walls 27 and 28 between dye 19 and reagent 20, which member, when the dye and/or the reagent expand, punctures both separating walls 27 and 28 and hence cancels the separation between dye and reagent. In accordance with the embodiments of FIG. 10 and FIG. 11 the dye 19 is separated from the reagent 20 by means of a separating layer 30 which is adapted to be destroyed on freezing. In this case, in accordance with FIG. 10 the dye 19 is arranged in its own container formed by the separating layer 30 within the reagent. The separating layer consists of a brittle resin which is readily destroyed during a change of volume, so that the separation between dye and reagent is cancelled.

In order to simplify manufacture, storage and filling, an indicating device, according to a further embodiment, in accordance with FIG. 12 is itself either strip-like, e.g. formed as a flat tube or also in accordance with FIG. 13 may be arranged on a strip-like carrier. With the strip-like development according to FIG. 12, the separation of dye 19 and filling 20 may be obtained e.g. by a fold located between the chambers.

To permit strips formed in accordance with FIGS. 12 and 13 to be readily packed and the individual devices adapted to be readily separated, the strips in accordance with FIGS. 12 and 13 are provided on at least one side with a contact adhesive, preferably on their underside. The strips with the devices are then readily rolled up and drawn off therefrom or even folded in e.g. a "Leporello" fold.

In the embodiments illustrated in FIGS. 14 to 19 of the indicating device a different method of detection is employed; a change of form of the control member or vessel is used for indication of an inadmissible temperature increase, this being caused by the change of volume of a filling compound.

Figure 15:
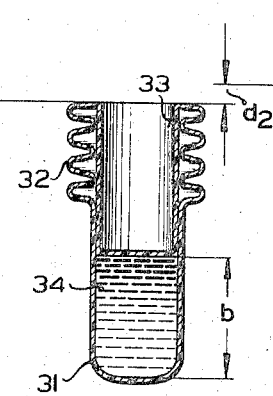
Figure 16:
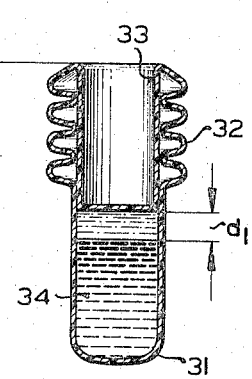

The indicating member in accordance with FIGS. 14 to 16 comprises a container 31, the upper wall of which continues as a concertina wall 32. The concertina wall ends in a cup-shaped inwardly inverted closure part 33. The internally disposed folds of the bellows 32 are supported in self-locking manner against the outside of the cup-shaped closure part 33. The lower part of the container 31 is filled with a compound 34 which changes its volume due to a temperature change.

The method for indicating that the required temperature of a deep-freeze article has been exceeded is effected with the aid of such a member in the following manner: FIG. 14 shows the member before being put to use, at about room temperature. The compound 34 has expanded in the container to the level $a$. In this state the member is placed in the deep-freezing container, and caused to assume deep-freezing temperature. On reaching this temperature, the filling level of the compound 34 withdraws to the level $b$ in accordance with FIG. 15. Now the cup-shaped closure part 33 is pressed to the level of the compound 34 into the container by finger pressure, as shown by FIG. 15. Subsequently and in this state the member is connected with the deep-frozen article to be supervised, e.g. by attaching to a package. If the deep-frozen article and hence the member are heated, then the compound 34 expands in dependency upon the temperature increase and rises in the container 31 by an amount $d2$ in accordance with FIG. 16. If the deep-frozen article and hence also the member now cool again, then the compound 34 on reaching the deep-freeze temperature again drops to the filling level $b$, whilst the cup-shaped closure part 33 owing to its self-locking action remains located on the concertina walls 32 in the position reached during the heating. The distance $d2$ therefore is a measure of the temperature deviation from the deep-freeze temperature.

Figure 17:
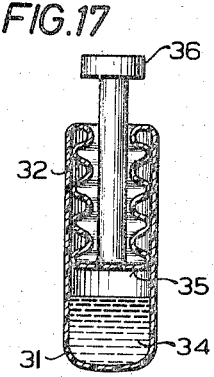

In FIG. 17 a further embodiment of an indicating member is shown. The compound adapted to change volume is located in the container 31. The concertina walls 32 extend downward into the container and are retained in self-locking condition against the inside of the container wall. The concertina walls 32 end in a closed bottom 35. A setting and indicating ram 36 on the base 35 projects outwardly from the container. The method of operation with this member is similar to that above-described.

Figure 18:
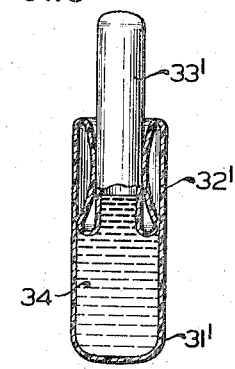

FIG. 18 shows a further embodiment of an indicating member. Container 31' and closure part 33' are formed of a closed cylindrical body having sections of different diameter. By interposition of a self-locking concertina wall-like connection 32', container 31' and closure part 33' are adapted to be slidingly engaged in one another. On reaching the deep freeze temperature and before fitting to the article to be frozen, the closure part 33' is forced to such an extent into the container 31', that the interior space of the container 31' and of the closure part 33' is filled completely with the compound 34, e.g. a liquid, but not the pockets of the concertina walls 32'. The extent to which the closure part 33' protrudes from the container 31' in turn is the measure for the temperature increase.

Figure 19:
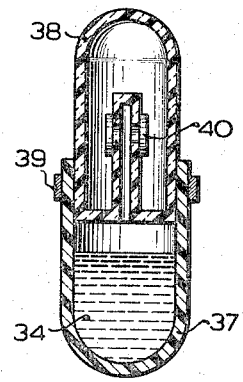

FIG. 19 shows an alternative embodiment of an indicating member. This member consists of the container 37 in which a compound 34 adapted to change its volume is disposed. The closure part is in this case formed as a piston-like outwardly closed transparent hollow body 38 guided in self-locking manner in the container. For the self-locking action between container 37 and hollow body 38 a clip 39 is used, which ensures sealing against penetration of the liquid 34. The hollow body 38 is provided internally with a non-return valve 40 which permits the liquid 34 to enter the hollow body. At deep-freeze temperature the hollow body 38 is forced into the container 37 to the level of the liquid 34. With a temperature change the liquid 34 then rises through the non-return valve to the hollow body 38, where it remains and indicates the extent of temperature rise by the amount in the body 38.

The described indicating members are preferably accommodated in a common holder in the deep-freeze container at deep-freeze temperature, so that they may be individually removed and connected without any further preparation to the deep-freeze product.

If necessary suitable means are provided on the indicating member in order to permit enclosed air to escape when pressing in a movable closure part.

It is to be pointed out that in the embodiments shown in FIGS. 6 to 19 the volume change causing the change of state of the filling compound when solidifying may come into effect either by expansion or by contraction of the compound, depending upon the method selected.

I claim:

1. An indicator device for indicating temperature variations, particularly of frozen products, comprising an elongated flexible tubular container having a first container portion containing a dye, a second container portion containing a liquid, and a third container portion located intermediate said first and second container portions and having an inner surface composed of two opposite surfaces, said third container portion being normally folded in two successively reverse axial directions of said tubular container so that said opposite surfaces are in sealing engagement with one another whereby said first and second container portions are sealingly separated from one another and so that unfolding of said third container portion establishes communication between said first and second container portions.

2. An indicator device for indicating temperature variations, particularly of frozen products, comprising an elongated flexible tubular container having a first container portion containing a dye, a second container portion containing a liquid, and a third container portion located intermediate said first and second container portions and having an inner surface composed of two opposite surfaces, said third container portion being normally twisted about its longitudinal axis so that said opposite surfaces are in sealing engagement with one another whereby said first and second container portions are sealingly separated from one another and so that untwisting of said third container portion establishes communication between said first and second container portions.

References Cited by the Examiner

UNITED STATES PATENTS

| | | | |
|---|---|---|---|
| 2,460,215 | 1/1949 | Chase | 99—192 |
| 2,622,018 | 12/1953 | Smith | 99—192 |
| 2,788,282 | 4/1957 | Hammond | 99—192 |
| 3,055,759 | 9/1962 | Busby et al. | 99—192 |
| 3,065,083 | 11/1962 | Gessler | 99—192 |

ROBERT A. O'LEARY, *Primary Examiner.*

W. E. WAYNER, *Assistant Examiner.*